United States Patent [19]

Küsebauch et al.

[11] 4,174,954
[45] Nov. 20, 1979

[54] METHOD FOR CONVERTING A REACTION MIXTURE CONSISTING OF HYDROCARBON-CONTAINING FUEL AND AN OXYGEN-CONTAINING GAS INTO A FUEL GAS

[75] Inventors: Walter Küsebauch, Erlangen; Hana Kostka, Nürnberg-Grossgründlach; Hans-Joachim Henkel, Erlangen; Christian Koch, Erlangen; Eugen S. de Bucs, Erlangen; Theo Weber, Adlitz b. Erlangen, all of Fed. Rep. of Germany

[73] Assignee: Siemens Aktiengesellschaft, Berlin and Munich, Fed. Rep. of Germany

[21] Appl. No.: 878,767

[22] Filed: Feb. 17, 1978

Related U.S. Application Data

[63] Continuation of Ser. No. 747,935, Dec. 6, 1976, abandoned.

[30] Foreign Application Priority Data

Dec. 29, 1975 [DE] Fed. Rep. of Germany ....... 2558922

[51] Int. Cl.² ............................ C10G 11/28; C01B 2/16
[52] U.S. Cl. ........................................... 48/212; 123/3; 422/160; 422/211
[58] Field of Search ............. 48/107, 212, 215, 197 R; 23/288 R, 288 K, 288 L; 123/3; 423/344; 252/373; 422/160, 211

[56] References Cited

U.S. PATENT DOCUMENTS

| | | | |
|---|---|---|---|
| 1,030,508 | 6/1912 | Eschellmann et al. | 23/288 R |
| 2,127,561 | 8/1938 | Herrmann | 23/288 R |
| 3,362,787 | 1/1968 | Matchen | 423/344 |
| 3,595,626 | 7/1971 | Sowards | 23/288 R |
| 3,754,870 | 8/1973 | Carnahan et al. | 23/288 F |
| 3,828,736 | 8/1974 | Koch | 123/3 |
| 4,026,248 | 5/1977 | Lee | 48/21 L |

FOREIGN PATENT DOCUMENTS 482157 8/1929 Fed. Rep. of Germany .

OTHER PUBLICATIONS

"Chemical Engineers Handbook," Perry, 1963, pp. 20-44 and 20-45.

Primary Examiner—S. Leon Bashore
Assistant Examiner—Peter F. Kratz
Attorney, Agent, or Firm—Kenyon & Kenyon

[57] ABSTRACT

In a gas generation method in which liquid fuel is catalytically reacted with air at elevated temperatures to form a fuel gas, several plates each having a multiplicity of passage openings are arranged in tandem in spaced fashion within the reaction chamber of the gas generator and are embedded in a bed of packing material with the thermal conductivity of the plates higher than that of the packing material in order to obtain more uniform heating of the reaction chamber and better mixing and distribution of the reacting media permitting the gas generator to be loaded more heavily.

18 Claims, 4 Drawing Figures

METHOD FOR CONVERTING A REACTION MIXTURE CONSISTING OF HYDROCARBON-CONTAINING FUEL AND AN OXYGEN-CONTAINING GAS INTO A FUEL GAS

This is a continuation, of application Ser. No. 747,935, Filed Dec. 6, 1976, now abandoned.

BACKGROUND OF THE INVENTION

This invention relates to gas generators for converting a reaction mixture consisting of atomized, vaporized or evaporated liquid, hydrocarbon fuel and a gas containing oxygen into a fuel gas at elevated temperature and more particularly to a gas generator which obtain more uniform heating and can thus be more heavily loaded.

In what are known as reformed gas generators, atomized, vaporized or evaporated liquid hydrocarbon fuel is reacted with a gas containing oxygen, for instance, air or exhaust gas, and is converted at elevated temperature into a fuel gas (reformed gas) containing carbon monoxide, methane and/or hydrogen. This fuel gas can be mixed, for instance, with combustion air and fed to an internal combustion engine. While in internal combustion engines fed with liquid fuel, as in motor vehicles, an incomplete vaporization of the fuel and the nonuniform mixing with combustion air leads to incomplete combustion and emission of harmful substances, the reformed gas is burned largely without residue. Furthermore, since it has a high octane number, the addition of antiknock media can be dispensed with, so that the content of substances detrimental to health in the exhaust gas of the internal combustion engines is lowered.

German Pat. No. 482,157 teaches a method in which hydrocarbon fuel is processed with air in a gas generator for feeding to an internal combustion engine. The gas generator contains several parallel tubes of catalytically active metal which are accommodated in a housing. The fuel/air mixture can be conducted through the tubes which act as the reaction chamber and are heated by exhaust gas flowing through the housing, or the exhaust gas can be conducted through the tubes and the reaction mixture through the housing. The reaction chamber may also contain metal filings or other catalytically active packing materials. Ribs or other profiled parts may be attached to the tubes for improving the heat transfer. The reaction chamber may also be heated electrically instead of with exhaust gas and catalytical metal fabric, wires, balls or plates may also be provided instead of the catalyzer tubes.

Capacity increases over such reactors, i.e., a high degree of conversion of the liquid fuel used even with high fuel throughout is provided by the reformed gas generator described in U.S. Pat. No. 3,828,736. In the gas generator disclosed therein, several spaced plates of porous ceramic material, which are impregnated with a catalytic metal component and are provided with a multiplicity of passage openings, are arranged in tandem in the reaction chamber. Such catalyzer plates have a large specific surface and at the same time have a small catalyst volume. The spaces between the plates serve as mixing chambers for the reformed gas generated at the preceding plate and for the part of the reaction mixture which has not yet reacted and which is being fed to the pores of the subsequent plate. In order to maintain the elevated reaction temperature at the catalyzer plates, the reaction chamber is also heated from the outside by the hot exhaust gas of the internal combustion engine connected to the reformed gas generator.

Stabilization of the flow in a reformed gas generator containing catalysts by letting a temperature resistant body having flow canals precede the catalysts has been proposed. By doing so, the flow of the reaction mixture against the catalysts is always laminar and no turbulence develops in the spaces between the catalysts, which turbulence could lead to the formation of flames. The temperature resistant plates for this purpose preferably are plates of ceramic material, e.g., ceramic alumina-silicate fibers, with flow canals punched therethrough.

SUMMARY OF THE INVENTION

It is an object of the present invention to increase the conversion attainable with a gas generator, and to increase the load capacity of the reactor charge.

According to the present invention, this is achieved in a gas generator of the type described in U.S. Pat. No. 3,828,736 by embedding the plates into a bed of packing material and by using plates which have higher thermal conductivity than the packing material.

A reactor charge designed in this manner brings about, on the one hand, better temperature equalization within the reactor chamber, and, on the other hand, a relatively uniform distribution of the flowing reaction mixture over the entire reaction chamber. The highly heat conductive plates counteract the development of temperature gradients transversely to the flow direction. The plates themselves as well as the layers of the packing material bed surrounding the plates are heated reasonably uniformly, while at the same time the reaction mixture flowing through the reaction chamber is distributed more or less statistically over the cavities between the packing material pieces.

The particle size of the packing material is preferably small enough that the bed has a large surface and that spaces between the packing material pieces are not sufficient for a flame to develop; but, on the other hand, the packing material pieces should be large enough that the bed does not present an excessively high flow resistance to the reaction mixture flowing through the reaction chamber. The largest dimension e.g. length, of the packing material particles is preferably about 1 to 6 mm, the smallest dimension at least about 0.8 mm.

The packing material may, for instance, be in the form of balls or small cylindrical rods. In the case of cylindrical rods, the largest dimension is then understood to be the rod length, and the smallest dimension, the diameter. In the case of balls, the largest and smallest dimension coincide with the ball diameter. The spacing of the plates is advantageously about 5 to 20 mm.

In the gas generator according to the invention, hydrocarbons can be reacted thermally or thermally-catalytically with the gas containing oxygen. If, for instance, gasoline is to be reacted with air thermally and not catalytically, then the reactor charge is heated up by its own reaction heat, and the thermal decomposition of the reaction mixture takes place at the hot surfaces of the reactor charge with high reaction speeds.

In one embodiment of the gas generator according to the present invention, the packing material has a catalytically active surface in order to catalytically control the reaction in the reformed gas generator. Such packing material may consist, for instance, of porous ceramic bodies which are impregnated with a catalytically active component.

The plates themselves may also advantageously have a catalytically active surface. Porous, ceramic, sintered slabs may be used to advantage as plates. The plate thickness is preferably between 5 and 20 mm. Advantageously, about 10 to 100 passage openings per cm$^2$ of plate area, which extends transversely to the flow direction of the reactants, are distributed over the surfaces of the sintered slabs. The diameter of the passage openings may be between 0.6 and 3 mm. The sintered slabs preferably have a thickness of about 10 mm and about 40 passage openings of about 1 mm diameter per cm$^2$ of plate surface.

The porosity of the sintered slabs is advantageously between 20 and 60% by volume. Such sintered slabs, which consist, for instance, of $Al_2O_3$ and $MgO$, are described in U.S. Pat. No. 3,878,130. However, sintered slabs which have a porosity of between 100 and 250% by volume can also be used advantageously. Although the thermal conductivity of these highly porous sintered slabs is reduced as compared with that of less porous sintered slabs, it can be improved by embedding catalytically active metal components in the pores. Such catalytically active sintered slabs can be manufactured, for instance, in the manner described in U.S. Pat. No. 3,926,850 and have a carrier material of $Al_2O_3$, to which Kaolinite is admixed to increase the mechanical strength. The porosity referred to in line 7 above is open porosity, i.e., as the volume of the open pores (without passage canals), referred to the volume of the pore walls.

In sintered slabs with a catalytically active surface, the pores situated at the surface of the plates and their passage openings represent a large catalytically active surface, while at the same time permitting the volume to be kept small. In addition, these sintered slabs have a thermal conductivity which is larger than that of the packing material bed; they therefore make possible improved temperature equalization in the radial direction, i.e., perpendicular to the flow direction of the reaction mixture in the reaction chamber. When flowing through a plate, the reaction mixture thus hits a sufficiently hot catalytically active surface at which it is reacted in all parts of this plate. Since predominantly laminar flow is present in the passage openings, a still reactable reaction mixture flows against these surfaces only to a depth of a few millimeters. However, since the packing material layers situated between the plates not only distribute the gas mixture flowing through the reaction chamber statistically over the flow cross section but also mix it vigorously, the surfaces in the passage openings of the following plate come into contact with the not yet reacted reaction mixture. Thus, a nearly complete conversion is already achieved with few plates in series even for high loads, particularly if the packing material bed itself has an active surface.

In another embodiment of the invention, the plates consist of a metallic material. Thereby, increased mechanical strength and even better heat conduction within the packing material bed is obtained.

It is particularly advantageous in this connection if the total of the cross sectional area of the passage openings per unit area of the plates increases toward the edge of the plate. Such plates have a flow resistance which decreases toward the ends of the plate. This prevents a core flow, with a mass throughput per unit of cross sectional area which is increased in the center of the plates from developing, while the flow through the openings at the plate edges and the adjacent packing material beds is insufficient and the catalytic activity of the reactor charge is not utilized there.

The metal plates are preferably made of molybdenum silicide ($MoSi_2$) to which stabilizing, recrystallization-inhibiting additives are admixed. Such a material is commercially available from Gesiwid Elektowärme Gmbh, Erlangen, Germany under the registered trademark "Mosilit" ("Römpp's Chemie-Lexikon," 7th edition, Stuttgart, 1974, vol. 4, page 2222). This hard metal can be produced by powder-metallurgical methods and fabricated into shaped bodies which are distinguished by great hardness and temperature stability as well as by high metallic heat conductivity.

The molybdenum silicide can advantageously be used also as the carrier material for catalytically active components. The molybdenum silicide plates may also have, however, a silicon dioxide coating generated by annealing in air at temperatures above 1350° C. For, in annealing work pieces of molybdenum silicide in this manner, the molybdenum diffuses out of the surface and the silicon forms, through oxidation with oxygen in the air, a fused silica-like, catalytically inactive coating. This prevents, for instance, metals which are present in the packing material bed as active components from forming an alloy with the molybdenum silicide at higher operating temperatures of the generator.

It is further advantageous to arrange bodies of metallic material which have wall surfaces extending parallel to the flow direction in the packing material bed. This increases the thermal conductivity of the reactor charge also in the flow direction and the entire reactor charge is heated uniformly by the reaction heat produced in the reaction. Thus, the catalytic activity of the parts of the reactor charge which are located further downstream in this charge can be utilized for reacting small portions of the reaction mixture, which have not yet been reacted in the parts of the reactor charge located upstream. The high thermal conductivity in the reactor charge is also advantageous in the case of reactions which do not proceed exothermically and in which the heat required for the reaction must be supplied from the outside, e.g. by heating the reactor walls.

Metal strips or tube sections arranged perpendicular to the plates may be provided, for instance, as such bodies. However, it is also possible to use ribs attached to the walls of the reaction chamber or metal pins which are embedded in the packing material bed and are anchored in holes of the plates. These may also pass through several plates via corresponding holes. Advantageously, these bodies are also made of molybdenum silicide any may have a gas tight, fused silica-like coating.

DETAILED DESCRIPTION OF THE INVENTION

Figure 1:
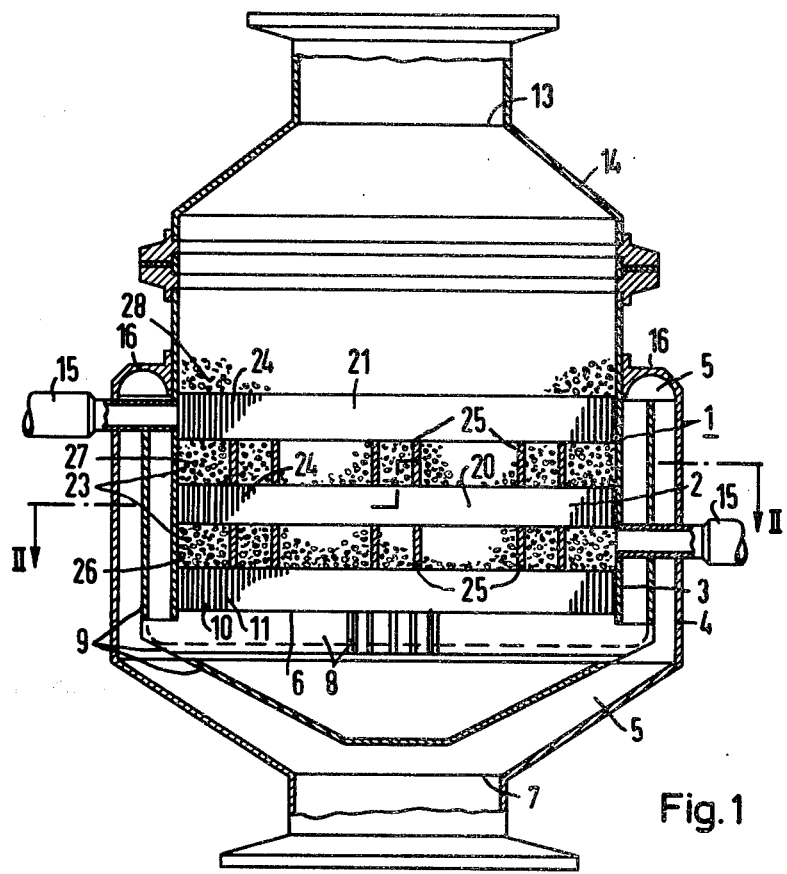
FIG. 1 is a longitudinal cross section through a first embodiment of the gas generator according to the present invention.
Figure 2:
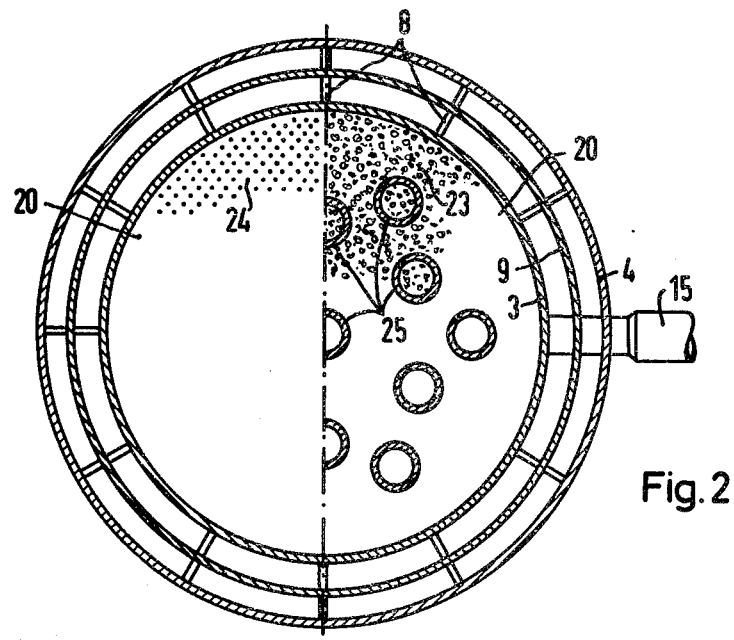
FIG. 2 is a cross section along the line II—II through FIG. 1.
Figure 3:
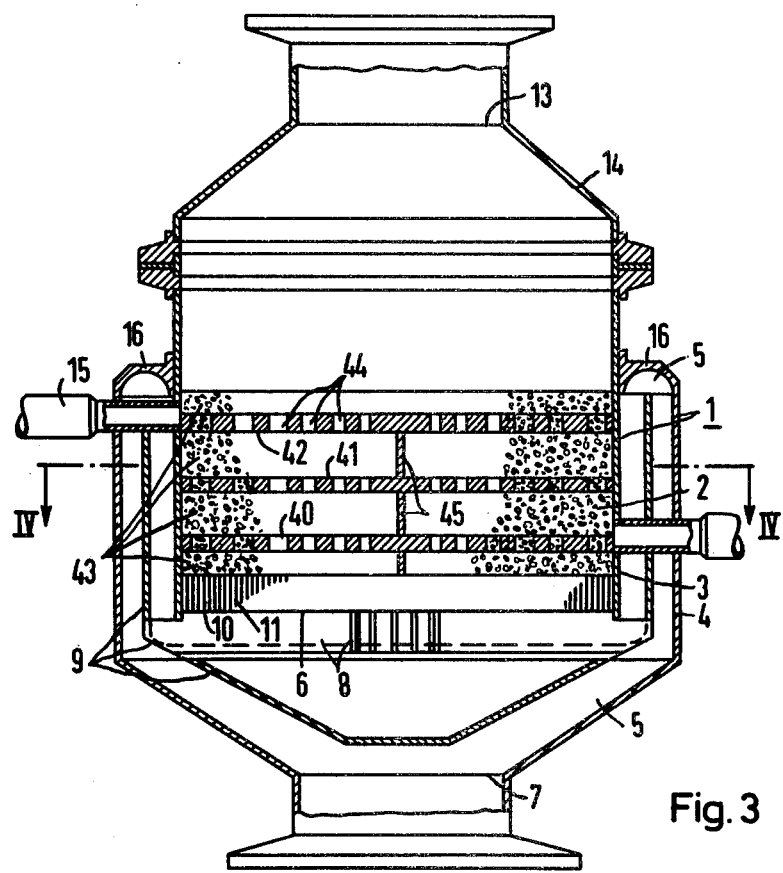
FIG. 3 is a longitudinal cross section through another embodiment of the gas generator according to the present invention.

The housings of the gas generators shown in FIGS. 1 and 3 consist essentially of a reaction chamber 2 surrounded by a double walled shell 1. The cavity 5 of the shell, formed by the walls 3 and 4 and an annular profiled part 16 is connected via a passage opening 6 to the reaction chamber 2 and, via an outlet opening 7, for instance, to the intake line of an internal combustion engine. The passage opening 6 occupies the entire base area of the cylindrical inner wall 3. Guide baffles 8 which are perpendicular to the plane of the passage opening 6 and lead outward in star-fashion are welded to the lower edge of this inner wall 3. A cup-shaped metal sheet 9 which extends up to near the annular profiled part 16 is fastened to these guide baffles. Sheet 9 conducts the gas leaving the reaction chamber radially outward, deflects it, conducts it along the inside wall 3 of the shell, deflects it again at the profiled part 16 and conducts it counterflow-wise along the outer wall 4 to the outlet opening 7. Through this arrangement, the wall 3 defining the reaction chamber is held at the mean exit temperature of the fuel gas by the discharging fuel and is protected from heat loss to the environment and from being cooled down.

For generating fuel gas for the operation of an internal combustion engine, the gas generator is fed a mixture of evaporated gasoline and air, for instance, via the inlet opening 13 in the housing lid 14. Via lateral nozzles 15, leading through the shell 1, the interior of the generator is accessible for measuring and control devices. Thus, the temperature in the reaction chamber can be measured, for instance, via a thermocouple.

On the guide baffles 8 rests a sintered slab 10 with a multiplicity of passage openings 11. Packing material 23 is piled above this sintered slab 10 and two further sintered slabs 20 and 21 are embedded in the packing material bed. Thus, three packing material layers 26, 27, 28, which have a thickness of about 12 mm are provided. The thickness of the sintered slabs 20 and 21 located in between is about 10 mm. The sintered slabs 10, 21 and 21 have about 40 passage openings 11 and 24 per cm² of plate area with a diameter of about 1 mm. The sintered slabs consist of a porous ceramic material, e.g. about 26% MgO and 74% $Al_2O_3$, which is impregnated with a catalytically active metal component, e.g. with about 10 mg nickel per cm³ of catalyst carrier. For instance, small cylindrical rods with a diameter of about 1 mm and 3 mm long, of $Al_2O_3$ with 0.3% by weight Fe, 0.3% by weight Cr and 1.0% by weight molybdenum may be used as packing material.

Because of their compact structure, the sintered slabs produce a thermal conductivity perpendicular to the flow direction of the materials passing through the reactor which is improved over that of the packing material bed. For improving the thermal conductivity in the flow direction of the materials, cylindrical tube sections 25 of $MoSi_2$, the cylinder surface of which extends in the flow direction are disposed between the sintered slabs.

Figure 4:
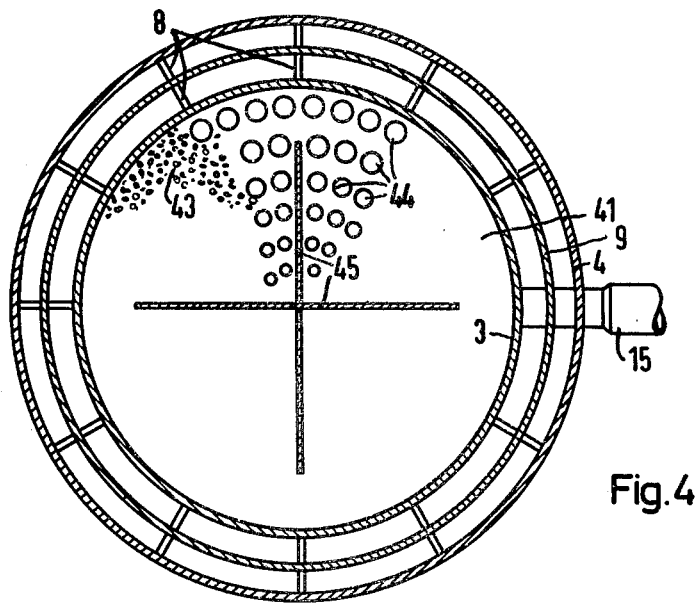
FIG. 4 is a cross section along the line IV—IV through FIG. 3.

In FIG. 3, another embodiment of the gas generator according to the invention is shown. The housing corresponds to that of the gas generator shown in FIG. 1 and is provided with the same reference numerals. Above the ceramic sintered slab 10 lying in the passage opening 6 is piled a packing material bed, in which metallic plates 40, 41 and 42, each with a thickness of 5 mm, are embedded at a spacing of 15 mm. These plates carry six concentric rows of passage openings 44, the number and size of which increases toward the edge of the plate. As is shown in FIG. 4, the inner row has six passage openings with a diameter of about 0.5 mm, and the outer row 36 passage openings with a diameter of 10 mm. The inside diameter of the reaction chamber is about 10.5 cm. Between these plates there are sheet metal strips 45, assembled in star-fashion which stand vertically on the plates 10, 40, 41 and 42 and which impart to the reactor charge good thermal conductivity in the lengthwise direction. To avoid undesirable catalytic activity of the metallic parts, the reaction chamber is lined with a protective ceramic layer, e.g. aluminum oxide, and the plates 40 and metal strips 45 are made of molybdenum silicide, which was given an inert, fused silica-like coating by annealing in air.

With the gas generator according to the invention, the conversion of hydrocarbon fuel and air into a fuel gas can be improved substantially, as the following experiments show.

CONTROL EXPERIMENT

Using a housing of the kind described above with an inside diameter of the reaction chamber of 10.5 cm, a ceramic sintered slab is arranged in the discharge opening of the gas generator. This sintered slab consists of about 26% by weight MgO and 74% by weight $Al_2O_3$, is not impregnated with any active metal component and has about 40 passage openings with a diameter of about 1 mm per cm² of plate area uniformly distributed over the plate surface. Upon this plate, about 0.4 l of a catalytically active packing material bed are piled. Small cylindrical rods with a length of about 1 mm and a diameter of about 1 mm are used as packing material. These are made of a carrier material consisting of about 60% by weight $\gamma$-$Al_2O_3$, 10% by weight $\eta$-$Al_2O_3$ and 30% by weight $\delta$-$Al_2O_3$ impregnated with a catalytically active metal component of about 3.7% by weight molybdenum, 1.6% by weight chromium and 1.7% by weight iron, referred to the total weight of the catalytic packing material. The preparation of such a catalyst is described in U.S. patent application Ser. No. 585,398 now U.S. Pat. No. 3,984,210.

For operating an internal combustion engine, a mixture of gasoline vapor and air is fed to the generator. The hot fuel gas generated in the gas generator is subsequently conducted through two heat exchangers and a cooling trap and can then either be taken off for analysis purposes or fed, mixed with further combustion air, to an internal combustion engine. In the two heat exchangers, the gasoline used is evaporated and the air is preheated, the raw materials also passing through a gas mixer before being fed to the gas generator.

In this experimental arrangement, 6.5 l of gasoline per hour are reacted with about 10% of the amount of air required for the stoichiometric reaction of the gasoline. In the steady state operation of the arrangement, temperatures of about 270° C. adjust themselves at the generator inlet 13 for the raw materials fed to the gas generator, and maximally 840° C. for the catalytic charge. The fuel gas produced, with is cooled in the cooling trap to about 19° C., and is separated from the condensate collected there, has a content of about 7% $CO_2$, 6% $H_2$, 5% methane, 5.3% CO, 10.8% ethane and about 10% other hydrocarbons with two to four carbon atoms per molecule. The fuel gas also contains about 0.3% $O_2$ and 55.5% $N_2$ from the air supplied.

With this fuel gas, an internal combustion engine can be operated without trouble.

If the gasoline throughput is increased to above 10 l per hour, however, uneven running and stalling of the internal combustion engine occurs sometimes with the improvement of the Present Invention.

EXAMPLE

Three metal plates according to the metal plate 40, shown in FIG. 4, of V2A steel with passage openings are now placed in the catalytic packing material bed of the gas generator; the number and size of the passage openings increases toward the edge of the plate.

In the experimental arrangement, 6.0 l of gasoline per hour are reacted with about 8% of the amount of air required for the stoichiometric reaction of the gasoline.

Here, a temperature of the raw materials of about 490° C. and a temperature of the catalytic charge of maximally 830° C. adjusts itself. Behind the cooling trap, the fuel gas still has a temperature of 50° C. The gas analysis of the fuel gas shows a composition of 6.5% $CO_2$, 7.4% $H_2$, 3.7% methane, 8.4% CO, 7.3% ethane, about 8.6% other hydrocarbons with 2 to 4 carbon atoms per molecule and about 0.3% $O_2$ and 57.9% $N_2$ (from the air). particularly noteworthy is the increase of the CO and $H_2$ content, which is advantageous for the operation of an internal combustion engine. With the fuel gas obtained, the internal combustion engine can be operated without trouble even with throughputs of 27 l of gasoline per hour.

It would seem that the improvement obtained can be explained primarily by the more uniform temperature distribution in the generator. Due to the high thermal conductivity of the perforated plates, the entire cross section of the catalytic charge is heated almost uniformly to the operating temperature of the catalyst. If, however, regions with a lower temperature are present in the reactor charge, besides regions with higher temperature, then only an incomplete conversion of the raw materials will take place in the less strongly heated regions. Especially where the throughput is increased, it may occur that the reaction heat produced in this incomplete reaction is not sufficient to heat the inflowing cooler raw materials as well as the catalytic charge itself sufficiently, so that the temperature and, thereby, the degree of conversion, drop still further in these regions. Thereby, the mean temperature of the generated fuel gas also drops, whereby the teperature of the reactor wall also drops. With higher throughputs, it would seem therefore that in the control experiment, particularly in the vicinity of the reaction wall, regions are present in which the catalytic charge does not reach the operating temperature.

The metal plates embedded in the bed of catalyst, on the other hand, cause these border zones to be heated better not only due to their better thermal conductivity, but also due to the better distribution of the raw materials that takes place in them. For, this distribution prevents preferred flow paths from being developed in the reactor charge. Otherwise it could occur that, with higher throughputs, the regions of the catalytic charge with the stronger flow are overloaded, while next to them are other regions with less flow in which the temperature of the catalyst is below the operating temperature of the catalyst. Through the plates, it is achieved in particular, however, that there is also enough flow through the border zones of the catalytic charge so that sufficient chemical reaction of the raw materials and more heat development take place there. Accordingly, the temperature as well as the chemical reaction are distributed more uniformly over the entire reactor charge in the gas generator according to the invention, and the reactor can thereby be loaded more heavily.

We claim:

1. A method of converting a reaction mixture consisting of atomized, vaporized or evaporated liquid, hydrocarbon fuel and a gas containing oxygen into a fuel gas at an elevated temperature in a gas generator including a reaction chamber comprising
    (a) imbedding a plurality of plates comprising porous ceramic sintered slabs containing a multiplicity of passage openings and having a surface which is catalytically active with respect to hydrocarbon fuels in a bed of packing material made up of a plurality of packing material grains such that said plates are diposed spaced one behind the other perpendicular to the flow direction of the reactants through the reaction chamber, said plates having a higher thermal conductivity than the packing material bed; and
    (b) passing the reaction mixture through said reaction chamber to convert it into a fuel gas.

2. The method according to claim 1 wherein the largest dimension of the packing material grains is about 1 to 6 mm.

3. The improvement according to claim 2 wherein the smallest dimension of said packing material grains is at least about 0.8 mm.

4. The method according to claim 1 wherein the spacing of said plates is about 5 to 20 mm.

5. The method according to claim 1 wherein said packing material has a surface which is catalytically active with respect to hydrocarbon fuels.

6. The method according to claim 1 wherein said sintered slabs have a thickness of 5 to 20 mm.

7. The method according to claim 6 wherein said sintered slabs have about 10 to 100 passage openings per $cm^2$ of plate area.

8. The method according to claim 7 wherein the diameter of said passage openings is between 0.6 and 3 mm.

9. The method according to claim 8 wherein said sintered slabs have a thickness of about 10 mm and about 40 pasage openings of about 1 mm diameter for each $cm^2$ of plate area.

10. The method according to claim 6 wherein the porosity of said sintered slabs is about 20 to 60% by volume.

11. The method according to claim 6 wherein the open porosity of said sintered slabs is about 100 to 250% by volume.

12. A method of converting a reaction mixture consisting of atomized, vaporized or evaporated liquid, hydrocarbon fuel and a gas containing oxygen into a fuel gas at an elevated temperature in a gas generator including a reaction chamber comprising
    (a) packing a plurality of plates made of a metallic material and containing a multiplicity of passage openings within the reaction chamber in a bed of plurality of packing material grains of a material which is catalytically active with respect to hydrocarbon fluids, such that said plates are disposed spaced one behind the other perpendicular to the flow direction of the reactants through the reaction chamber, said plates having higher thermal conductivity than said packing material bed; and (b) passing the reaction mixture through said reaction chamber to convert it into a fuel gas.

13. The method according to claim 12 wherein the total of the cross section area per unit area of the metal plates of the passage openings increases toward the edges of the metal plates.

14. A method of converting a reaction mixture consisting of atomized, vaporized or evaporated liquid, hydrocarbon fuel and a gas containing oxygen into a fuel gas at an elevated temperature in a gas generator including a reaction chamber comprising
   (a) packing a plurality of plates made of molybdenum silicide each of said plates having a multiplicity of passage openings in a packing material bed of a plurality of packing material grains of a material which is catalytically active with respect to hydrocarbon fuels, such that said plates are arranged spaced one behind the other perpendicular to the flow direction of the reactants through the reaction chamber, said molybdenum silicide having a higher thermal conductivity than said packing material bed; and
   (b) passing the reaction mixture through said reaction chamber to convert it into a fuel gas.

15. The method according to claim 14 wherein said molybdenum silicide plates carry catalytically active components 16. The method according to claim 14 and further including a gas-tight silicon dioxide coating on said molybdenum silicide.

17. The method according to claim 14 and further including disposing bodies of metallic material with wall surfaces extending parallel to the flow direction arranged in the packing material bed.

18. The method according to claim 17 wherein said bodies consist of molybdenum silicide with a gas-tight silicon dioxide coating.

* * * * *